United States Patent [19]

Kaye

[11] 4,043,053

[45] Aug. 23, 1977

[54] EDUCATIONAL GAME

[76] Inventor: Steven Kaye, 66 Empress Pines Drive, Ronkonkoma, N.Y. 11779

[21] Appl. No.: 622,839

[22] Filed: Oct. 16, 1975

[51] Int. Cl.² ............................................. G09B 5/02
[52] U.S. Cl. ............................... 35/8 R; 35/DIG. 3; 40/106.1
[58] Field of Search .................. 35/8 R, 9 E, 9 F, 75, 35/DIG. 3; 40/106.1

[56] References Cited

U.S. PATENT DOCUMENTS

| 3,400,470 | 9/1968 | Ritter | 35/9 F |
| 3,412,480 | 11/1968 | Connell | 35/9 E |

FOREIGN PATENT DOCUMENTS

| 135,624 | 11/1933 | Austria | 35/75 |
| 1,339,169 | 8/1963 | France | 35/75 |

*Primary Examiner*—Anton O. Oechsle
*Attorney, Agent, or Firm*—Bauer, Amer & King

[57] ABSTRACT

An educational game is provided and includes a transparent sleeve having a plurality of elongated compartments in which movable opaque slides are positioned. A set of transparencies are also provided and on each transparency there is a column of legends that are spaced so as to be in juxtaposition with a grip formed on at least one surface of the transparent sleeve. Thus, each of the legends, which may be in the form of questions or statements, are in alignment with one of the squares in the transparency grid. A projector is positioned so that the legends on the transparencies may be projected onto a surface such as a wall. As the opaque slides are withdrawn successive legends will be projected. The legends may be answered as part of a teaching technique or a game may be played with a plurality of individuals or teams with the time being a factor for answering the questions or identifying the legends. As the slides are pulled out further the questions or statements become progressively more difficult.

1 Claim, 5 Drawing Figures

FIG. 1

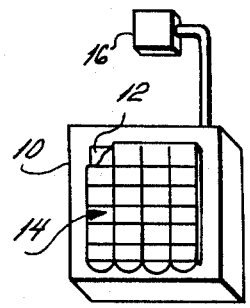

FIG. 2

| COMMON MEASURES | MATH JUMBLES | "A" DEFINITIONS | SQUARE ROOTS |
|---|---|---|---|
| 2 PINTS | ROZE | COMBINING NUMBERS | THE SQUARE ROOT OF 64 |
| 4 PECKS | INOUN | 2 RAYS SHARING THE SAME ENDPOINT | THE SQUARE ROOT OF 400 |
| A LITTLE MORE THAN 39 INCHES | PLUMITLY | ANY NUMBER THAT IS TO BE ADDED | THE SQUARE ROOT OF 169 |
| ABOUT 454 GRAMS | BUSTES | ANY MATH STATEMENT ACCEPTED AS TRUE | THE SQUARE ROOT OF 1,000,000 |
| 1440 MINUTES | REVINES | ORIENTAL COUNTING BOARD | IT'S SQUARE ROOT IS A LITTLE MORE THAN 1.4 |

U.S. Patent  Aug 23, 1977  Sheet 2 of 2  4,043,053
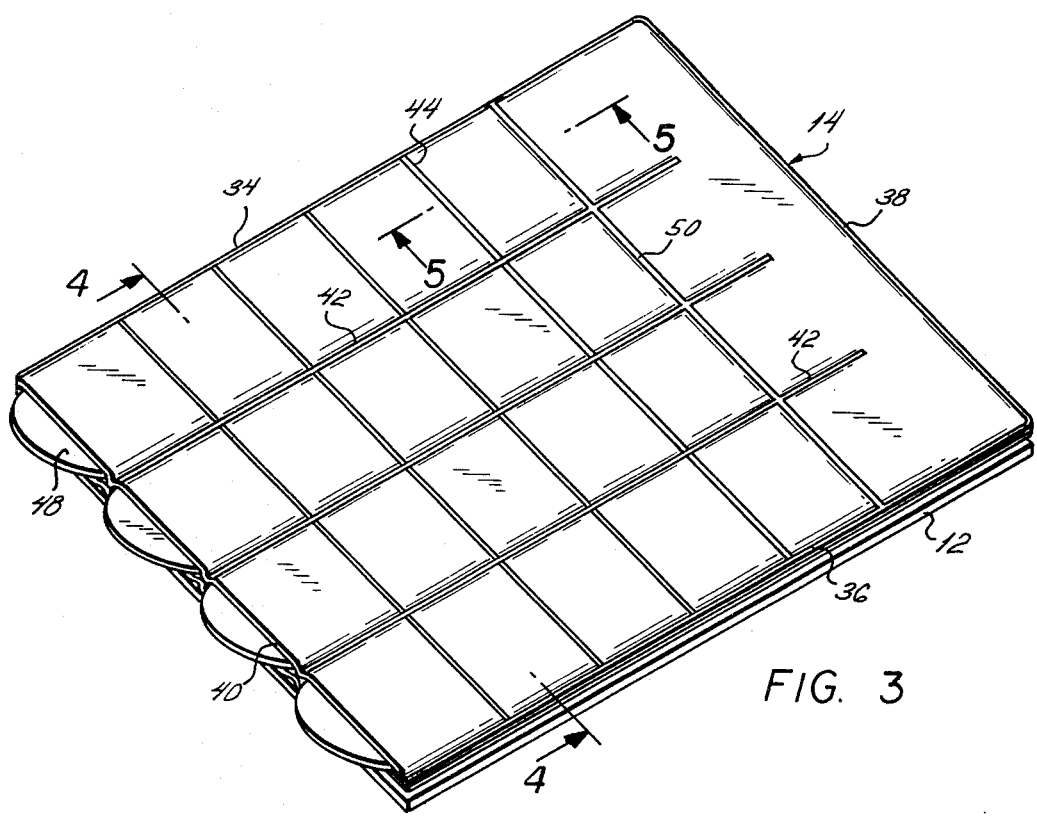
FIG. 3
FIG. 4
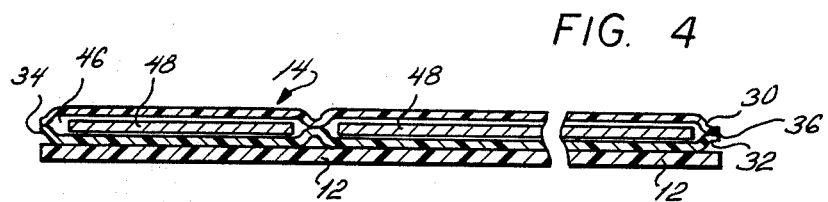
FIG. 5
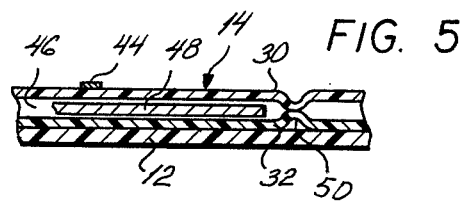

EDUCATIONAL GAME

The aforementioned Abstract is neither intended to define the invention of the application which, of course, is measured by the claims, nor is it intended to be limiting as to the scope of the invention in any way.

BACKGROUND OF THE INVENTION

Field of the Invention

This invention relates generally to the field of games and more particularly to an educational game.

SUMMARY OF THE INVENTION

The present invention provides very simple means for teaching various subjects by making a game out of the learning process. The present invention utilizes a projection system, for example an overhead projection system, that is a standard item in virtually all educational institutions. A transparency having a plurality of columns of legends in the forms of statements, questions or the like is placed on the projection system. A transparent sleeve is super-imposed over the transparency. The transparent sleeve is provided with a plurality of elongated compartments each of which receives a slideable, opaque member that may be inserted and/or withdrawn so as to successively expose the legends in each of the columns. The transparent sleeve has a grid printed on at least one surface thereof and the legends are oriented such that each statement or question falls into one of the squares of the grid. Thus, as the slides are withdrawn, the legends are successively exposed in order to be projected onto a surface. The device of this invention may be used as an educational device wherein the projected questions are successively answered or a game may be played by two or more individuals or by teams of individuals with time being the factor in answering the questions. The answers may also be written.

Accordingly, it is an object of the present invention to provide an improved educational game.

Another object of the present invention is to provide an educational game as described above, wherein a plurality of transparencies are provided.

A further object of the present invention is to provide an improved educational game, as described above, wherein the questions become successively more difficult to answer by exposing the questions one at a time.

Still another object of the present invention is to provide an improved educational game, such as described above, utilizing a conventional projection system.

A further object of the present invention is to provide an improved educational game, as described above, wherein the transparencies may be readily changed.

These and other objects, features and advantages of the invention will, in part, be pointed out with particularity and will, in part, become obvious from the following more detailed description of the invention, taken in conjunction with the accompanying drawings, which forms an integral part thereof.

BRIEF DESCRIPTION OF THE DRAWING

In the various figures of the drawing like reference characters designate like parts.

In the Drawing:

FIG. 1 is a perspective view, partially broken away illustrating the present invention with a portion thereof being shown schematically;

FIG. 2 is a plan view of a typical transparency that may be used with the present invention;

FIG. 3 is an exploded, perspective view of the sleeve and transparency assembly comprising the present invention;

FIG. 4 is a transverse, sectional elevational view taken along line 4—4 of FIG. 3; and FIG. 5 is a fragmentary, sectional elevational view taken along line 5—5 of FIG. 3.

DESCRIPTION OF THE PREFERRED EMBODIMENT

Referring first to FIG. 1 there is shown the basic elements of the present invention. A support surface, such as a table 10 for example, is provided for receiving first a transparency 12 and then a sleeve 14, both of which will be described in more detail hereinafter. A conventional projection system, such as an overhead projector 16 is used for projecting the subject matter of the transparency 12 onto a surface (not shown).

Referring now particularly to FIG. 2 it will be seen that the transparency 12 is provided with four columns of legends 18, 20, 22 and 24. Each of the four columns of legends 18, 20, 22 and 24 have a different subject matter for this particular transparency 12 although it should be readily apparent that only a single subject matter may be provided just as easily as a plurality of subject matters. Each of the columns of legends 18, 20, 22 and 24 are provided with a heading in order to identify the general subject matter therein. In the embodiment illustrated the legends in the columns 18, 20, 22 and 24 are separated into a grid pattern. The grid is schematically illustrated by the vertical lines 26 and the horizontal lines 28. It should be understood however that the lines 26 and 28 need not appear on the transparency 12 itself.

As shown in FIG. 3, FIG. 4 and FIG. 5, the transparent sleeve 14 is comprised of upper and lower sheets 30 and 32, respectively, which are heat sealed to each other along the longitudinal side edges 34 and 36 thereof as well as along only one end edge 38. Thus, the other end 40 is open. In addition, there are a plurality of longitudinally extending heat sealed lines 42 that coincide generally with the lines 26 shown schematically on FIG. 2. In order to form the grid pattern a plurality of lines 44 are provided on at least one surface of the sleeve 14 perpendicularly to the heat sealed lines 42. The lines 44 coincide generally with the lines 28 shown schematically in FIG. 2. The layers 30 and 32 may be made of a transparent plastic material such as polyethylene which readily permits formation of the heat seals by the use of conventional equipment.

Referring specifically now to FIG. 4 and FIG. 5, it will be seen that the heat seal lines 42, in combination with the longitudinal side edges 34 and 36, form a plurality of side-by-side compartments 46, each of which is adapted to receive an opaque slide 48 which is inserted in and withdrawn from the sleeve 14 utilizing the open end 40 thereof. There is further provided a single, horizontal, heat sealed line 50 that extends between the side edges 34 and 36 in order to provide stop means for limiting the inward movement of the slides 48.

With the projector 16 turned on the slides 48 may be withdrawn so as to successively expose the legends in each of the columns 18, 20, 22 and 24 on the transparency 12. It will be evident that only a single legend need be exposed at any one time. Moreover, as the appropriate slide 48 is withdrawn the legends may become successively more difficult to answer. Thus, the present invention can be used with one or more individuals and may be used with teams of individuals answering the questions proposed by the legends according to the headings in each column 18, 20, 22 or 24 and utilizing either verbal responses or written answers as is most convenient.

There has been disclosed heretofore the best embodiment of the invention presently contemplated. However, it is to be understood that various changes and modifications may be made thereto without departing from the spirit of the invention.

What is claimed is:

1. An educational game comprising:

a transparent sleeve formed of front and rear sheets of transparent plastic secured to each other along two spacedly opposed side edges thereof and along at least one visible line intermediate with and substantially parallel to said joined side edges, said at least one intermediate line, in combination with said side edges, defining at least two separate column-forming compartments in said sleeve;

a transparency being adjustable beneath and being juxtaposed with said sleeve and having a plurality of legends arranged thereon in columns, each said column being adjustable by the adjustment of said transparency for substantial alignment with a respective one of said sleeve column-forming compartments;

an opaque slide removably contained in each said columnar compartment and movable therewithin, each said column of legends on said transparency being adjustable for registry with one said slide such that movement of said slide withdrawing the same from within said sleeve columnar-compartment exposes the legend on said transparency adjusted for registry with said corresponding column;

said sleeve having two spacedly opposed end edges, one of which is open for receiving said slides, and an additional visible line sealing said front and rear sheets to each other, said additional line being substantially perpendicular to and extending between said side edges and spaced inwardly of said other end edge to thereby define stop means for the inward insertion of said slides and further defining a heading margin for each said column of legends of said transparency, there being a heading on said transparency corresponding to the subject matter for each said column of legends with said heading being in registry with a heading margin on said sleeve when said transparency is in juxtaposition with and beneath said sleeve;

said sleeve being provided with a least one further visible line on at least one surface thereof substantially perpendicular to and extending between said side edges and being disposed between said additional line and said open end edge, said at least one further line cooperating with said at least one intermediate line and said additional line to define a grid so sized with respect to the legends on said transparency that said transparency can be adjusted to expose individual legends through individual squares of said grid;

and means for projecting one of said legends in any one of said columns onto a viewing surface when said slide that is in registry with the projected legend is at least partially withdrawn from its respective compartment;

said transparency being unconnected with and free of guidance by the sleeve, yet adjustable beneath the sleeve with the transparency being movable relative to the sleeve so as to position the legends on said sleeve in substantial alignment with respective columns of said sleeve in which the slide moves to expose the legends of said transparency for viewing and for light transmission by said projecting means;

whereby said transparent sleeve is reusable with another changed transparency having a plurality of different legends arranged thereon in columns by adjusting said other transparency in juxtaposition with and beneath said sleeve.

* * * * *